United States Patent [19]

Naccache

[11] Patent Number: 5,479,511
[45] Date of Patent: Dec. 26, 1995

[54] METHOD, SENDER APPARATUS AND RECEIVER APPARATUS FOR MODULO OPERATION

[75] Inventor: David Naccache, Maisons-Alfort, France

[73] Assignee: Thomson Consumer Electronics S.A., Courbevoie, France

[21] Appl. No.: 199,213

[22] PCT Filed: Oct. 27, 1992

[86] PCT No.: PCT/EP92/02449

§ 371 Date: Jul. 8, 1994

§ 102(e) Date: Jul. 8, 1994

[87] PCT Pub. No.: WO93/09620

PCT Pub. Date: May 13, 1993

[30] Foreign Application Priority Data

Nov. 5, 1991 [EP] European Pat. Off. ............. 91402958

[51] Int. Cl.$^6$ ................. H04L 9/28; H04L 9/00; H04N 7/167
[52] U.S. Cl. ..................... 380/28; 380/9; 380/10; 380/16; 380/23; 380/30; 380/49; 340/825.31; 340/825.34; 235/380
[58] Field of Search ................. 380/9, 10, 23, 380/25, 28, 30, 49, 24, 16; 235/379, 380

[56] References Cited

U.S. PATENT DOCUMENTS 4,306,111 12/1981 Lu et al. ..................... 380/30
5,231,668 7/1993 Kravitz ..................... 380/28

FOREIGN PATENT DOCUMENTS 0428252 5/1991 European Pat. Off. ....... H04N 7/167
1321883 2/1963 France ..................... 380/28
1175019 7/1964 Germany ..................... 380/28

OTHER PUBLICATIONS

J. H. Green, Jr. et al, "An Error–Correcting Encoder and Decoder of High Efficiency"; Proc.s of the I.R.E., (vol. 46, No. 10; Oct., 1958; pp. 1741–1744).
Philips Telecommunication Review, vol. 47, No. 3, Sep. 1989, Hilversum NL, pp. 1–19, "The Smart Card: A High Security Tool in EDP", By R. C. Perreira.
Proceedings of Crypto 90, 11–15 Aug. 1990, Berlin (DE), D. de Waleffe and J.–J. Quisquater, "Corsair: A Smart Card for Public Key Cryptosystems" pp. 502–513.
Recherche Operationnelle, vol. 24, No. 3, 1990, D. Naccache de Paz and H. Msilti, "A New Modulo Computation Algorithm", pp. 307–313.

*Primary Examiner*—Bernarr E. Gregory
*Attorney, Agent, or Firm*—Joseph S. Tripoli; Peter M. Emanuel; Robert D. Shedd

[57] ABSTRACT

An access control system involves a first cryptographic device communicating with a second cryptographic device using a modulo-based protocol. To transmit a message from the first device to the second device, a random number is combined with the number representing the message without using a modulo operation. As a result, the message is hidden. By performing a modulo operation in the second device on the received hidden message, the original message can be recovered. Modular operations by the first device can be avoided reducing the number of modular operations.

16 Claims, 2 Drawing Sheets

METHOD, SENDER APPARATUS AND RECEIVER APPARATUS FOR MODULO OPERATION

The present invention relates to a method, to a sender apparatus and to a receiver apparatus for modulo operation.

BACKGROUND

In access control systems, e.g. pay TV systems, square, or more general, d-th roots modulo X are used where X is a composite number having at least two large prime factors. Typically the length of such a number X (denoted |X|) is 64 bytes.

If a sender, e.g. a smart-card, communicates with a receiver only few data are transmitted in order to save time. But this results in an increased number of computation operations in the sender and/or receiver.

INVENTION

It is one object of the invention to disclose a method for time-reduced modulo operations. This object is reached by the inventive method disclosed in claim 1.

In principle the inventive method consists in secure sending of a number $S=D \mod X$ or of a set of numbers $S(j)=D(j) \mod X$, $j=1,\ldots,i$, from a sender device 28 to a receiver device 27, whereby X is a product of at least two big prime numbers and D is greater than X, comprising the following steps:

- picking a random number A or a set of random numbers A(j) by said sender device;
- calculating in said sender a value $E=D+A*X$ or a set of values $E(j)=D(j)+A(j)*X$, whereby X is stored in said sender, or calculating in said sender a set of values $E(j)=D(j)*B$, whereby a fixed number $B=A*X$ is stored in said sender;
- transmitting via an interface 10 said value and said values, respectively, from said sender to said receiver;
- calculating by said receiver $S=E \mod X$ or $S(j)=E(j) \mod X$, whereby the number X is stored in said receiver device.

Advantageous additional embodiments of the inventive method are resulting from the respective dependent claims.

It is a further object of the invention to disclose a sender apparatus which utilizes the inventive method. This object is reached by the inventive apparatus disclosed in claim 6.

In principle the inventive sender apparatus consists in first computation means 25, first memory means 26 which are connected to said first computation means and first data exchange means 24 which are connected to said first computation means, whereby either

- said first memory means store said modulus X and said first computation means select said random number A or random numbers A(j) and calculate said value $E=D+A*X$ or calculate said set of values $E(j)=D(j)+A(j)*X$ or
- said first memory means store said fixed number B and said first computation means calculate said set of values $E(j)=D(j)+B$ and whereby said first data exchange means 24 send said value E or said set of values E(j) to said receiver device 27.

Advantageous additional embodiments of the inventive sender apparatus are resulting from the respective dependent claims.

It is a further object of the invention to disclose a receiver apparatus which utilizes the inventive method. This object is reached by the inventive apparatus disclosed in claim 7.

In principle the inventive receiver apparatus consists in second computation means 22, second memory means 21 which are connected to said second computation means and second data exchange means 23 which are connected to said second computation means, whereby said second memory means store said modulus X and said second computation means calculate the modulo function $S=E \mod X$ of said value E or calculate a set of modulo functions $S(j)=E(j) \mod X$ of said set of values E(j).

Advantageous additional embodiments of the inventive receiver apparatus are resulting from the respective dependent claims.

The invention is applicable when a first cryptographic device (sender) communicates with a second cryptographic device (receiver), especially when the devices use a modulo-based protocol. Thereby the required number of modular operations is reduced or even eliminated. It can be avoided to do modular operations by the first device.

This is particularly advantageous when said first device, e.g. a smart-card, has a weaker computational power (e.g. less RAM and/or ROM capacity, slower clock rate) than said second device (e.g. a powerful processor acting as a verifier).

There are such access control systems where all the numbers appearing in the first ("weaker") device have a size $n*|X|$ bytes before modular reduction, where n is a very small integer, typically 2 or 3.

There are different variants of the inventive method.
First variant:

Let D be a number of length $n,*|X|$ bytes.

The sender wishes to communicate $S=D \mod X$ to the receiver. For avoiding the modular reduction the sender chooses a random number A, computes $E=D+A,X$ and sends this value E to the receiver. Since A is random the value of D is hidden in E and the receiver can calculate S by: $S=E \mod X$, because $E \mod X=D \mod X+A*X \mod X=D \mod X$.

Second variant:

The sender wishes to communicate a set of i numbers $S(j)=D(j) \mod X$ to the receiver.

Number A is a secret of the sender. The sender keeps in a ROM a pre-calculated constant B, $B=A*X$.

As before, let $D(1),\ldots,D(i)$ be a set of numbers (all bigger than X) such that the set of values S(j) is to be send to the receiver. Then these D(i) can be hidden by sending to the receiver $E(1)=D(1)+B,\ldots,E(i)=D(i)+B$. The receiver will recover S(j) by calculating:

$S(j)=E(j) \mod X$, because $E(j) \mod X=D(j) \mod X+B \mod X=D(j) \mod X$.

Number i may have a value of 10.

The first and the second variant can be modified. This modification fits especially to smart-card applications. It allows the sender to perform squarings or a multiplication (which result is E) with only |X| RAM bytes.

For doing so the sender computes only the |X| lower bytes of E (denoted Low(E)) and sends them to the receiver. This computation of Low(E) requires only |X| RAM cells. After the receiver gets Low(E), the sender can reuse his |X| RAM bytes to compute the |X| higher bytes of E (denoted High(E)). When the receiver gets High(E) it calculates E=Concatenation (High(E),Low(E)) and continues its calculations as before. dr DRAWINGS Preferred embodiments of the invention will now be described with reference to the accompanying drawings, in which.

PREFERRED EMBODIMENTS

Figure 1:
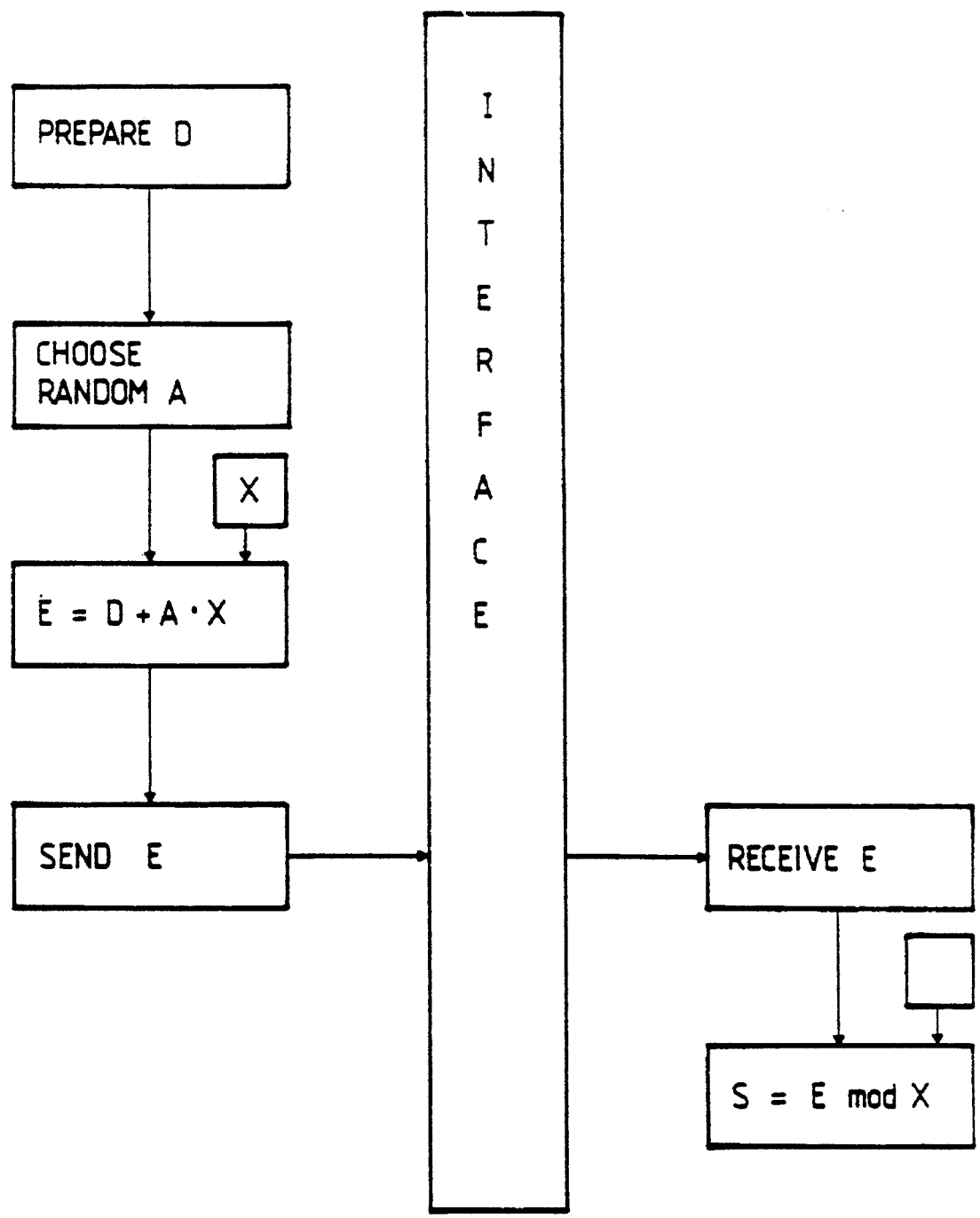
FIG. 1 shows an inventive communication protocol between the sender and the receiver.

FIG. 1 shows an interface 10 between a sender, e.g. a weak processor in a smart-card, and a receiver, e.g. a pay TV decoder, which may contain a powerful processor for calculating the modulo function. The microprocessor in the sender prepares a first number D or a first set of numbers D(j). Then it chooses a random number A and calculates E=D+A*X or it adds value B to each number D(j) and sends E and the set E(j), respectively, via interface 10 to the receiver side. The receiver calculates S=E mod X or S(j)= E(j) mod X from the received numbers.

Advantageous the final length |E| or |E (j)| of E and E (j), respectively, is less than four times the length |X| of X.

Figure 2:
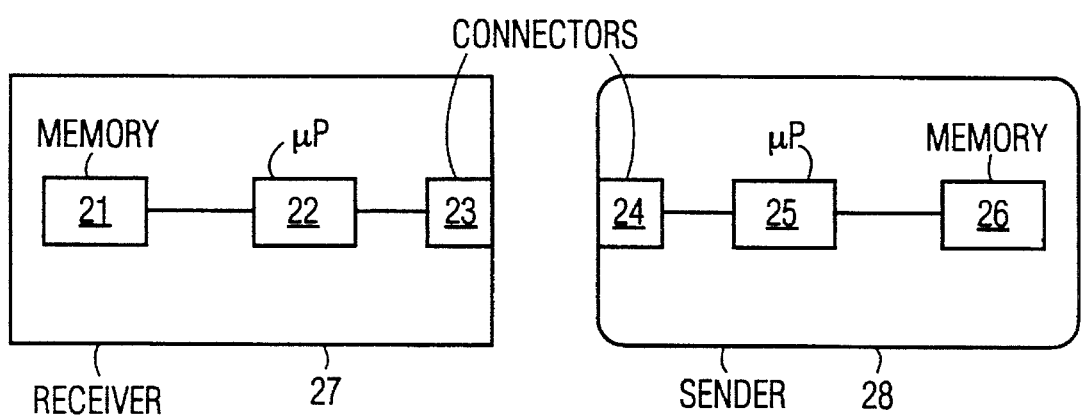
FIG. 2 shows a sender and a receiver.

In FIG. 2 a receiver device 27 and a sender device 28 are depicted. The sender device contains a first microprocessor 25, first memory means 26 which are connected to microprocessor 25 and a first connector 24 for data exchange with receiver device 27.

The receiver device 27 contains a second microprocessor 22, second memory means 21 which are connected to microprocessor 22 and a second connector 23 for data exchange with sender device 28.

First connector 24 and second connector 23 represent the interface 10 in FIG. 1. The first memory means 26 store intermediate calculation results and/or values X and/or B or Low(E)/High(E). First microprocessor 25 computes data as shown in the left side of FIG. 1.

The second memory means 21 store value X and/or intermediate results. Second microprocessor 22 computes data as shown in the right side of FIG. 1.

The invention can be used for identification (VideoCrypt or EuroCrypt Pay TV system) and/or digital signature (credit cards) and/or encryption, especially together with one or more of the following systems for getting in the receiver modulo calculated results without respective modulo calculation in the sender:

Fiat-Shamir;

Feige-Fiat-Shamir;

Quisquater-Guillou;

Fischer-Micali-Rackoff;

Naccache (EP-A-91400111, EP-A-91400301);

RSA;

Rabin.

These systems are published according to the following list:

Fiat-Shamir, "How to prove yourself: Practical solutions to identification and signature problems", A.Odlyzko editor, Advances in Cryptology, Proc. of Crypro '86, Aug. 11–15, (Lecture Notes in Computer Science 263), pp. 186–194, Springer Verlag, 1987, Santa Barbara, Calif., USA Feige-Fiat-Shamir, "Zero knowledge proofs of identity", Journal of Cryptology, 1(2), pp. 77–94, 1988

Quisquater-Guillou, "A practical zero-knowledge protocol fitted to security microprocessor minimizing both transmission and memory", C. G. Günther editor, Advances in Cryptology, Proc. of Crypto '88, Aug. 16–20, (Lecture Notes in Computer Science 330), pp. 123–128, Springer Verlag, 1988, Santa Barbara, Calif, USA Fischer-Micali-Rackoff, Unedited papers mentioned in the bibliography of Fiat-Shamir RSA: Rivest-Shamir-Adeleman, "A method of obtaining Digital Signatures and Public-key Cryptosystems", CACM, pp 120 126, VO1. 21, No. 2, Feb. 1978

Rabin, "Digitalized Signatures", Foundations of secure Computations, R. A. DeMillo et al. editors, Academic Press, pp. 155–166, London, 1987

I claim:

1. A method for encrypted communication of a message from a sender device to a receiver device, said message being represented by a set of numbers S(j)=D(j) mod X, j=1, . . . ,i, i being an integer greater than or equal to 1, X being a product of at least two big prime numbers and each D (j) being greater than X, said method comprising the steps of:

storing the value X in a first memory device of said sender device and in a second memory device of said receiver device;

producing in a first processor associated with said sender device a set of values E(j)=D(j)+A(j)*X from a set of random numbers A(j);

transmitting a signal representative of said values E(j) from said sender device to said receiver device via an interface;

processing said signal in a second processor associated with said receiver device for generating a set of numbers S(j)=E(j) mod X; and recovering said message from said set of numbers S(j)= E(j) mod X.

2. Method according to claim 1, wherein a transmitted word length of each of said values E (j) is less than four times the word length of X.

3. A method according to claim 1, or claim 2, wherein the steps of producing and transmitting said values E(j) include the steps of:

producing in said first processor a first |X| bytes of each of said values E(j) using |X| cells of said first memory device, |X| denoting the word length of X;

transmitting a first signal representative of said first |X| bytes of each of said values E(j) to said receiver device via said interface;

producing in said first processor a second |X| bytes of each of said values E(j) using said |X| cells of said first memory device;

transmitting a second signal representative of said second |X| bytes of each of said values E(j) to said receiver device via said interface; and wherein the step of generating said set of numbers S(j)=E(j) rood X in said second processor comprises the step of processing said first and second signals in said second processor for concatenating said second |X| bytes and said first |X| bytes of each of said values E(j) for reconstructing each of said values E(j).

4. A method according to claim 3, wherein said word length of X is in a range from 64 to 128 bytes .

5. A method according to claim 4, wherein said sender device is a smart-card.

6. A method for encrypted communication of a message from a sender device to a receiver device, said message being represented by a set of numbers S(j)=D(j) mod X, j=1, . . . ,i, i being an integer greater than 1, X being a product of at least two big prime numbers and each D (j) being greater than X, said method comprising the steps of:

storing the value X in a first memory device of said sender device and in a second memory device of said receiver device;

generating in a first processor associated with said sender device a random number A and a number B=A*X;

storing said number B in said first memory device of said sender device;

producing in a first processor associated with said sender device a set of values E(j)=D(j)*B;

transmitting a signal representative of said values E(j) from said sender device to said receiver device via an interface;

processing said signal in a second processor associated with said receiver device for generating a set of numbers S(j)=E(j) mod X; and recovering said message from said set of numbers S(j)=E(j) mod X.

7. Method according to claim 6, wherein a transmitted word length of each of the values E (j) is less than four times the word length of X.

8. A method according to claim 6 or claim 7, wherein the steps of producing and transmitting said values E(j) include the steps of:

producing in said first processor a first |X| bytes of each of said values E(j) using |X| cells of said first memory device, |X| denoting the word length of X;

transmitting a first signal representative of said first |X| bytes of each of said values E(j) to said receiver device via said interface;

producing in said first processor a second |X| bytes of each of said values E(j) using said |X| cells of said first memory device;

transmitting a second signal representative of said second |X| bytes of each of said values E(j) to said receiver device via said interface; and wherein the step of generating said set of numbers S(j)=E(j) mod X in said second processor comprises the step of processing said first and second signals in said second processor for concatenating said second |X| bytes and said first |X| bytes of each of said values E(j) for reconstructing each of said values E(j).

9. A method according to claim 8, wherein said word length of X is in a range from 64 to 128 bytes.

10. A method according to claim 9, wherein said sender device is a smart-card.

11. A sender device for encrypted communication of a message to a receiver device, said message being represented by a set of numbers S(j)=D(j) mod X, j=1, . . . ,i, i being an integer greater than or equal to 1, X being a product of at least two big prime numbers and each D(j) being greater than X, comprising:

memory means for storing X;

a processor coupled to said memory means for generating a set of values E(j)=D(j)+A(j)*X from a set of random numbers A(j);

data exchange means coupled to said processor for sending a signal representative of said values E(j) to said receiver device, said number X being stored in said receiver device and a set of values S(j)=E(j) mod X being generated in said receiver device for recovering said message from said set of values S(j)=E(j) mod X.

12. A sender device for encrypted communication of a message to a receiver device, said message being represented by a set of numbers S(j)=D(j) mod X, j=1, . . . ,i, i being an integer greater than 1, X being a product of at least two big prime numbers and each D(j) being greater than X, comprising:

memory means for storing X;

a processor coupled to said memory means for generating a number B=A*X from a random number A and for generating a set of values E(j)=D(j)*B, said number B being stored in said memory means;

data exchange means coupled to said processor for sending a signal representative of said values E(j) to said receiver device, said number X being stored in said receiver device and a set of values S(j)=E(j) mod X being generated in said receiver device for recovering said message represented by said values D(j) mod X.

13. A sender device according to claim 11 or claim 12, wherein said sender device is one of a smart-card, a credit-card, a passport and a door-key.

14. A receiver device for evaluating an encrypted communication of a message from a sender device, said message being represented by a set of numbers S(j)=D(j) mod X, j=1, . . . ,i, i being an integer greater than or equal to 1, X being a product of at least two big prime numbers and each D(j) being greater than X, said receiver device comprising:

memory means for storing X;

data exchange means for receiving a signal generated in said sender device, said signal being representative of a set of values E(j)=D(j)+A(j)*X generated in said sender device by generating a set of random numbers A(j) and generating therefrom said values E(j);

a processor coupled to said memory means and to said data exchange means for processing said signal to generate a set of values S(j)=E(j) mod X for recovering said message.

15. A receiver device for evaluating an encrypted communication of a message from a sender device, said message being represented by a set of numbers S(j)=D(j) mod X, j=1, . . . ,i, i being an integer greater than 1, X being a product of at least two big prime numbers and each D(j) being greater than X, said receiver device comprising:

memory means for storing X;

data exchange means for receiving a signal from said sender device, said signal being representative of a set of values E(j)=D (j)* B generated in said sender device by generating a random number A and a number B=A*X, said number B being stored in said sender device;

a processor coupled to said memory means and to said data exchange means for processing said signal to generate a set of values S(j)=E(j) mod X for recovering said message.

16. A receiver device according to claim 14 or claim 15 wherein said receiver device comprises one of a pay TV decoder, a credit-card verifier, a passport verifier and an electronic lock.

* * * * *